(12) United States Patent
Kumagai et al.

(10) Patent No.: US 10,855,869 B2
(45) Date of Patent: Dec. 1, 2020

(54) INFORMATION PROCESSING APPARATUS, INFORMATION PROCESSING METHOD, AND STORAGE MEDIUM STORING PROGRAM FOR ACTIVATING APPLICATIONS

(71) Applicant: CANON KABUSHIKI KAISHA, Tokyo (JP)

(72) Inventors: Atsushi Kumagai, Yokohama (JP); Yuichi Kinoshita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/390,506

(22) Filed: Apr. 22, 2019

(65) Prior Publication Data

US 2019/0245997 A1 Aug. 8, 2019

Related U.S. Application Data

(63) Continuation of application No. PCT/JP2017/042398, filed on Nov. 27, 2017.

(30) Foreign Application Priority Data

Dec. 6, 2016 (JP) ................................. 2016-236404
Sep. 13, 2017 (JP) ................................. 2017-176146

(51) Int. Cl.
*H04N 1/00* (2006.01)
*G06F 9/48* (2006.01)
*G06F 9/445* (2018.01)

(52) U.S. Cl.
CPC ......... *H04N 1/00941* (2013.01); *G06F 9/445* (2013.01); *G06F 9/48* (2013.01);
(Continued)

(58) Field of Classification Search
None
See application file for complete search history.

(56) References Cited

U.S. PATENT DOCUMENTS

| 2008/0168474 A1 | 7/2008 | Jeon |
| 2015/0029530 A1 | 1/2015 | Asai |

(Continued)

FOREIGN PATENT DOCUMENTS

| JP | 2008-527530 A | 7/2008 |
| JP | 2014-086844 A | 5/2014 |

(Continued)

*Primary Examiner* — Thomas D Lee
(74) *Attorney, Agent, or Firm* — Canon U.S.A., Inc. IP Division

(57) ABSTRACT

An information processing apparatus includes a first application program for executing an output process on content and a second application program for executing a process of obtaining the content from an external apparatus. The information processing apparatus causes the first application program to issue a request for activating the second application program and activates the second application program so as to execute a process of obtaining content from the external apparatus through communication with the external apparatus. After obtaining the content from the external apparatus, the information processing apparatus causes the second application program to issue a request for activating the first application program and activates the first application program so as to execute the output process on the content obtained from the external apparatus.

14 Claims, 18 Drawing Sheets

(52) U.S. Cl.
CPC ..... *H04N 1/00307* (2013.01); *H04N 1/00411* (2013.01); *H04N 2201/0075* (2013.01)

(56) References Cited

U.S. PATENT DOCUMENTS

2016/0227596 A1  8/2016  Otani
2016/0274741 A1  9/2016  Kawai

FOREIGN PATENT DOCUMENTS

| | | |
|---|---|---|
| JP | 2015-22717 A | 2/2015 |
| JP | 2016-174348 A | 9/2016 |
| JP | 2016-177761 A | 10/2016 |

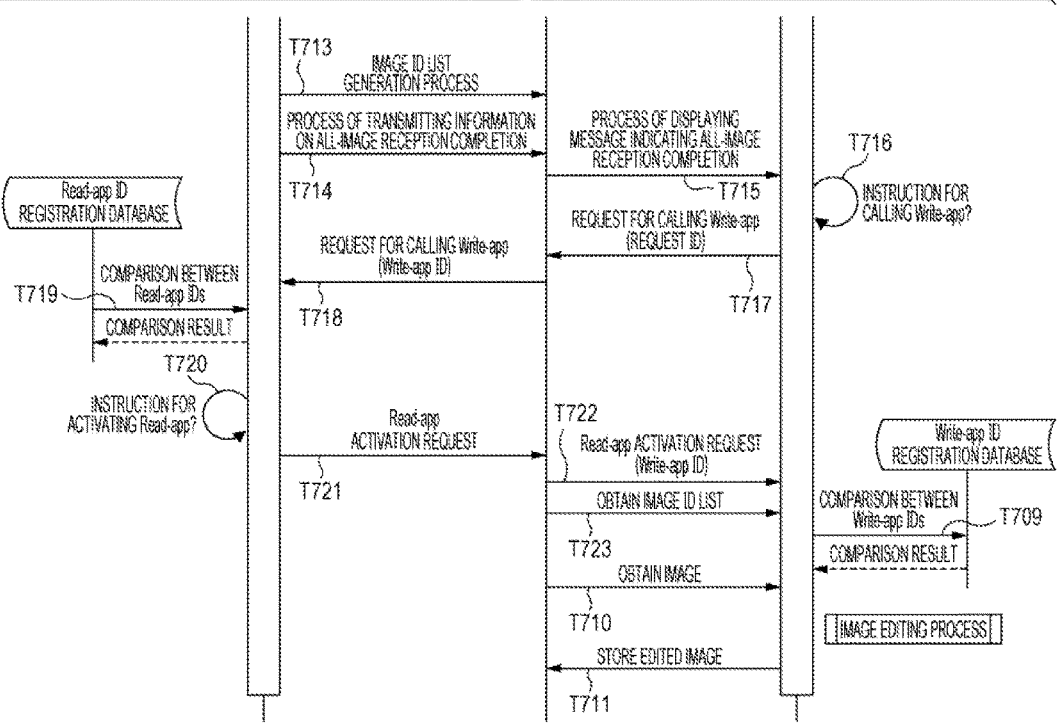

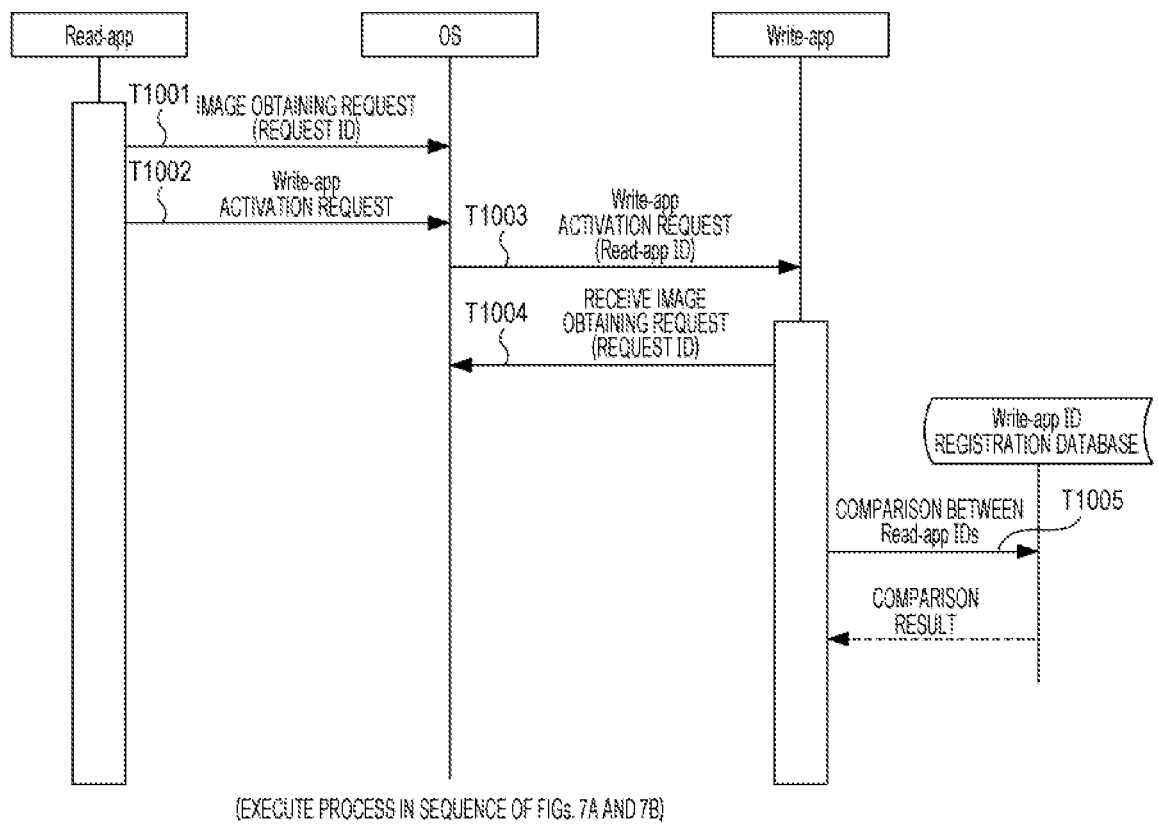

INFORMATION PROCESSING APPARATUS, INFORMATION PROCESSING METHOD, AND STORAGE MEDIUM STORING PROGRAM FOR ACTIVATING APPLICATIONS

CROSS-REFERENCE TO RELATED APPLICATIONS

This application is a Continuation of International Patent Application No. PCT/JP2017/042398, filed Nov. 27, 2017, which claims the benefit of Japanese Patent Application No. 2016-236404, filed Dec. 6, 2016 and No. 2017-176146, filed Sep. 13, 2017, all of which are hereby incorporated by reference herein in their entirety.

TECHNICAL FIELD

The present invention particularly relates to an information processing apparatus, an information processing method, and a storage medium storing a program which are suitably used to perform a process using a plurality of applications.

BACKGROUND ART

Information processing apparatuses including smartphones may realize various functions by installing an operating system (OS) and a plurality of applications and operating using the applications. Such an information processing apparatus may be connected to a camera using an application for connection to a camera so as to obtain an image and may edit an image using an application for image editing, for example. PTL 1 discloses a communication apparatus which performs communication with a digital still camera using an application for communication with camera.

A user selects and activates one of the applications corresponding to a desired function, and therefore, the user is required to search for data to be processed for each application. In a case where an image obtained by a camera is to be edited, first, an application for connection to a camera is activated and an image is obtained. Thereafter, an application for image editing is activated so as to search for the obtained image and edit the image, for example. When a process is performed by a plurality of applications as described above, a large number of operations are required for the user.

The present invention is made in view of the foregoing problem, and an object of the present invention is to smoothly perform a process when an application is activated during another application is operated.

CITATION LIST

Patent Literature

PTL 1 Japanese Patent Laid-Open No. 2014-86844

SUMMARY OF INVENTION

According to an embodiment of the present invention, an information processing apparatus includes an obtaining unit configured to obtain a request ID corresponding to processing content based on a first application, a first request unit configured to transmit the request ID and issue a request for activating a second application in accordance with the first application, a first processing unit configured to activate the second application in response to the activation request issued by the first request unit and execute a process based on the second application, a second request unit configured to transmit the request ID and issue a request for activating the first application when the process performed by the first processing unit is completed, and a second processing unit configured to activate the first application in response to the activation request issued by the second request unit and execute a process based on the request ID transmitted from the second request unit.

Further features of the present invention will become apparent from the following description of exemplary embodiments with reference to the attached drawings.

BRIEF DESCRIPTION OF DRAWINGS

FIG. 7B is a sequence diagram illustrating the procedure of the process of activating Read-app by Write-app and performing the image editing process.

FIG. 10 is a sequence diagram illustrating a procedure of a process of activating Write-app by Read-app, obtaining an image, and performing an image editing process.

DESCRIPTION OF EMBODIMENTS

First Embodiment

Hereinafter, a first embodiment of the present invention will be described with reference to the accompanying drawings. In this embodiment, a case where a user activates an image editing application by operating a communication device (a smartphone) functioning as an information processing apparatus and activates an application for data obtainment will be described as an example. Note that the term "activation" of an application according to this embodiment indicates a case where an application which has not been activated is activated and a case where an application being operated in a background is displayed in a foreground.

Figure 1:
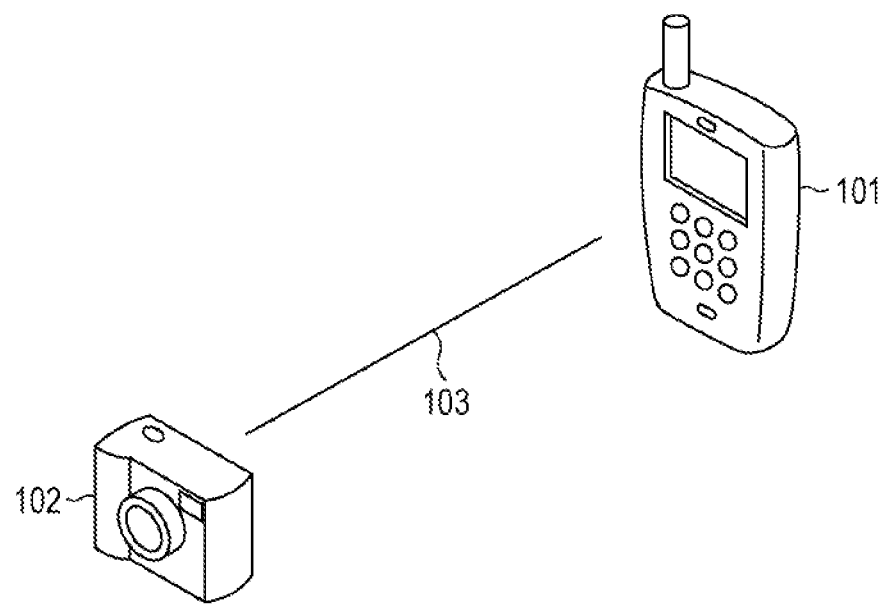
FIG. 1 is a diagram illustrating an example of a network configuration including a communication device.

FIG. 1 is a diagram illustrating an example of a network configuration including a communication device 101 according to this embodiment.

As illustrated in FIG. 1, the communication device 101 is connected to an imaging apparatus 102 using an application for data obtainment so as to obtain an image from the imaging apparatus 102 through a network 103. Note that the communication device 101 may be connected to the imaging apparatus 102 in a wired manner or a wireless manner.

Figure 2:
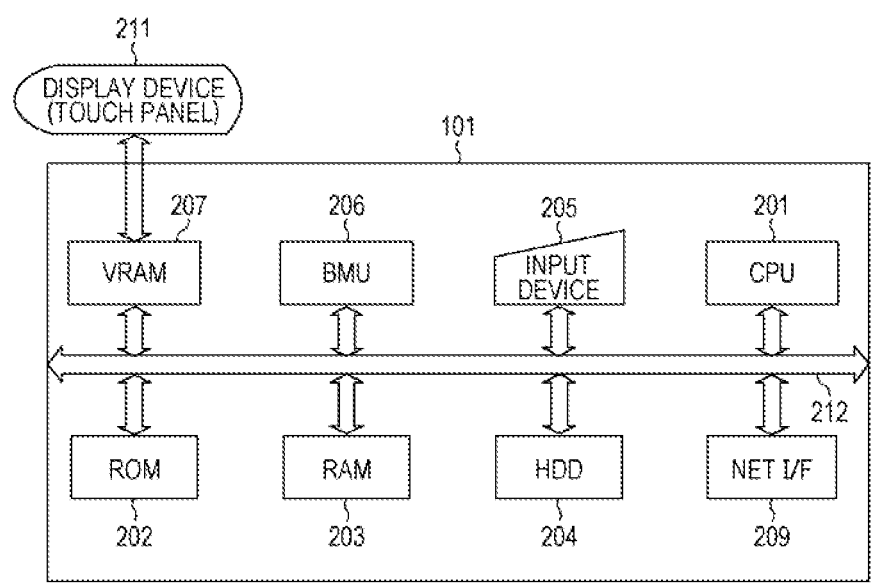
FIG. 2 is a block diagram illustrating an example of a hardware configuration of the communication device.

FIG. 2 is a block diagram illustrating an example of a hardware configuration of the communication device 101 according to this embodiment.

In FIG. 2, a central processing unit (CPU) 201 controls all processes of the communication device 101. A read only memory (ROM) 202 stores various control programs to be executed by the CPU 201, various data, and the like. A random access memory (RAM) 203 includes a work area for the CPU 201, a data save area used when an error process is performed, and a load area for the control programs. A hard disk drive (HDD) 204 stores an OS, various applications, the control programs to be executed in the communication device 101, content, and data.

An input device 205 includes various buttons, such as a button for performing switching between an ON state and an OFF state of a power source. A bit move unit (EMU) 206 controls data transfer between memories (between a video RAM (VRAM) 207 and another memory, for example) and data transfer between a memory and various input/output (I/O) devices (an NET interface (I/F) 209, for example). Image data to be displayed in a display device 211 is rendered in the VRAM 207. The image data rendered in the VRAM 207 is transferred to the display device 211 in accordance with a predetermined standard so that an image is displayed in the display device 211. Furthermore, the display device 211 includes a touch panel. When the user touches a display surface of the display device 211 so as to input an instruction corresponding to an icon displayed in a position of the touch. The NET I/F 209 communicates with the imaging apparatus 102 and the like through the network 103. A bus 212 includes an address bus, a data bus, and a control bus.

Figure 3:
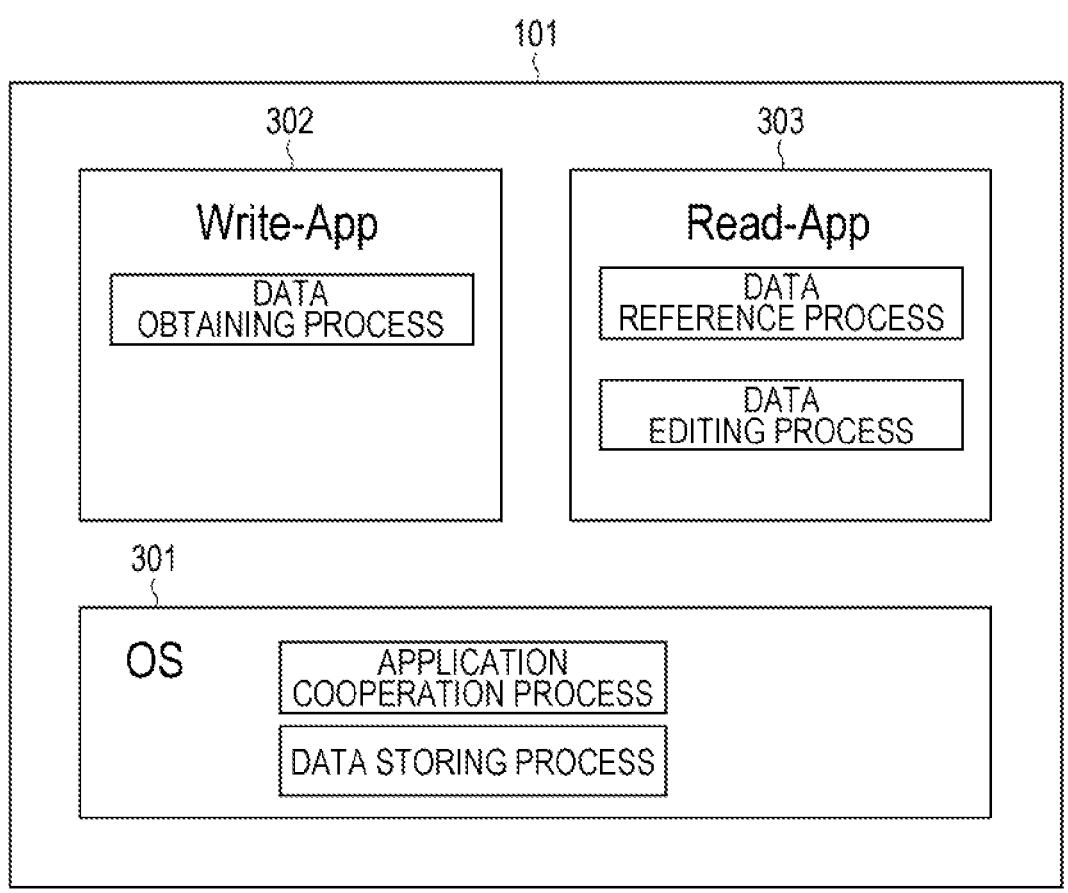
FIG. 3 is a diagram illustrating an example of a software configuration of the communication device.

FIG. 3 is a diagram illustrating an example of a software configuration of the communication device 101 according to this embodiment.

The communication device 101 includes a predetermined OS 301 mounted thereon and a data obtainment application (hereinafter referred to as Write-app) 302 and an image editing application (hereinafter referred to as Read-app) 303 installed therein. The CPU 201 of the communication device 101 activates the OS 301 so as to perform basic processes of the communication device 101 and performs cooperation processes of the installed applications and a process of recording data in the HDD 204 and the like. Furthermore, the CPU 201 of the communication device 101 activates Write-app 302 so as to perform a process of obtaining data from the imaging apparatus 102 through the NET I/F 209, for example. Furthermore, the CPU 201 of the communication device 101 activates Read-app 303 so as to perform a process of instructing a print apparatus to process an obtained image or print an image. Here, Write-app 302 is not only an input application but also an output application.

A procedure of a process performed by the communication device 101 according to this embodiment will now be described with reference to FIGS. 4 to 5D. In this embodiment, a case where the CPU 201 of the communication device 101 first activates Read-app 303 and receives an instruction for obtaining an image issued by the user in a screen for performing this process will be described as an example.

Figure 4A:
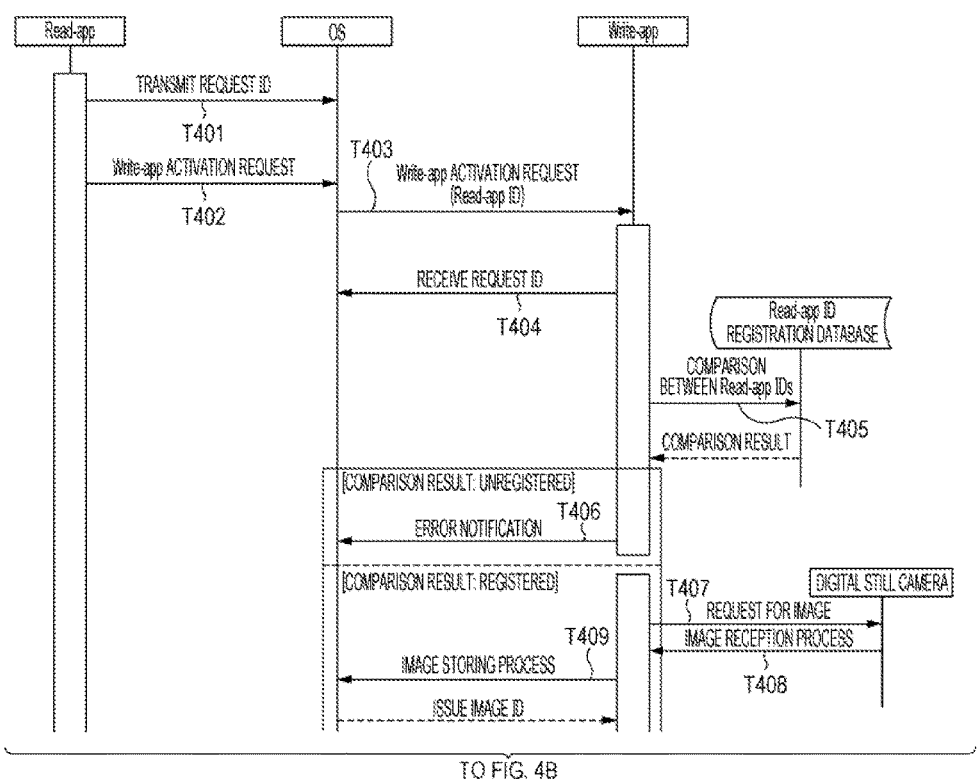
FIG. 4A is a sequence diagram illustrating a procedure of a process of activating Write-app by Read-app, obtaining an image, and performing an image editing process.
Figure 4B:
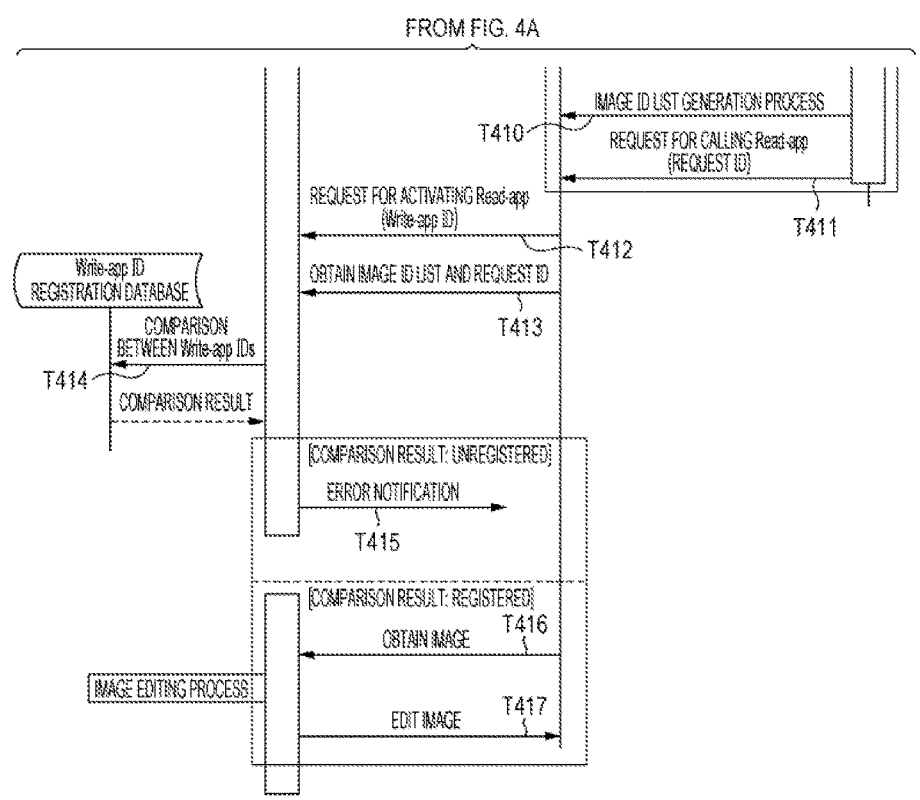
FIG. 4B is a sequence diagram illustrating the procedure of the process of activating Write-app by Read-app, obtaining an image, and performing the image editing process.

FIGS. 4A and 4B are sequence diagrams illustrating a procedure of a process of activating Read-app 303 before activating Write-app 302, obtaining an image from an external apparatus, and performing an image editing process, which is performed by the CPU 201 of the communication device 101 according to this embodiment. Note that a process described below is realized when the CPU 201 of the communication device 101 activates the OS 301, Write-app 302, and Read-app 303 and operates in accordance with the OS 301, Write-app 302, and Read-app 303, and controls the various units.

Figure 5A:
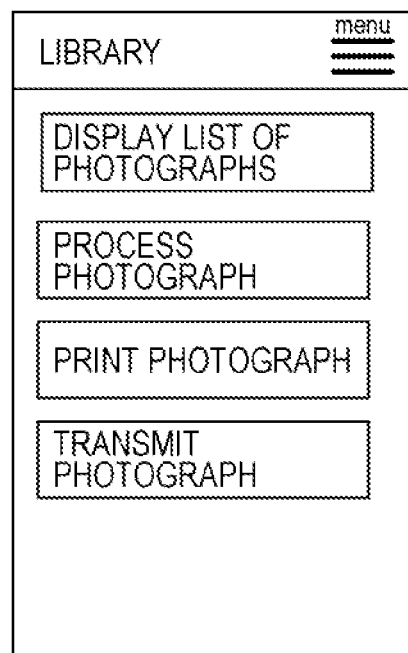
FIG. 5A is a diagram illustrating an example of a screen displayed when Read-app is activated.

First, the CPU 201 of the communication device 101 starts the process by activating Read-app 303. When Read-app 303 is activated, a screen illustrated in FIG. 5A is displayed in the display device 211. In the screen illustrated in FIG. 5A, the user selects content of editing to be executed through the touch panel of the display device 211.

Figure 5B:
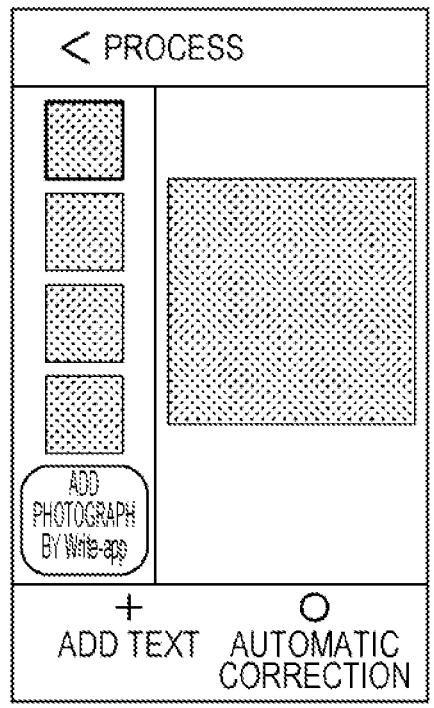
FIG. 5B is a diagram illustrating an example of a screen displayed when Read-app is activated.
Figure 5C:
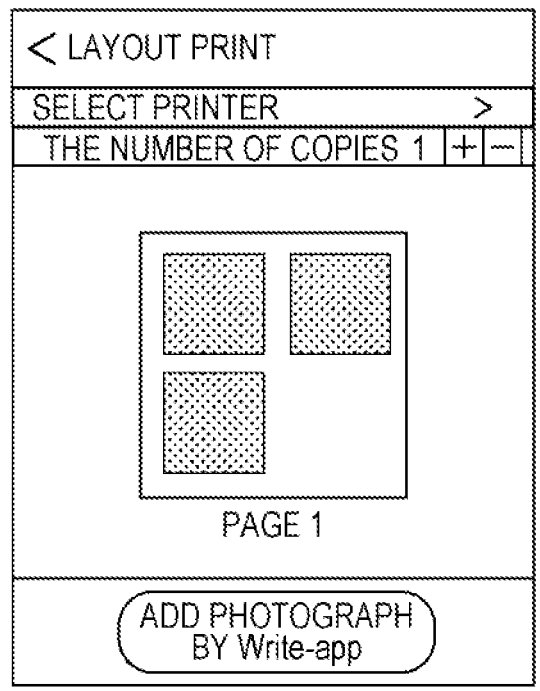
FIG. 5C is a diagram illustrating an example of a screen displayed when Read-app is activated.

For example, when "Process Photograph" is selected, a screen illustrated in FIG. 5B is displayed in the display device 211, and when "Print Photograph" is selected, a screen illustrated in FIG. 5C is displayed in the display device 211. When "Transmit Photograph" is selected, a screen illustrated in FIG. 5D is displayed in the display device 211. In the screens illustrated in FIGS. 5B to 5D, an image to be edited may be selected from among images stored in the HDD 204 or the like. On the other hand, when an image which is not stored in the communication device 101 is to be edited, "Add Photograph by Write-app" is selected so that an image is obtained from an external apparatus. The process in FIGS. 4A and 4B is started when the user selects "Add Photograph by Write-app".

In T401 of FIG. 4A, the CPU 201 causes Read-app 303 to issue a request ID. In T402, the CPU 201 receives a request for activating Write-app 302 supplied from Read-app 303 and stores the request ID issued in T401 and the activation request which are associated with each other in the HDD 204. Here, a request ID to be assigned varies depending on selected editing content. For example, a request ID varies depending on one of the screens illustrated in FIGS. 5B to 5D in which "Add Photograph by Write-app" is selected.

Subsequently, in T403, the CPU 201 causes the OS 301 to issue a request for activating Write-app 302 so as to activate Write-app 302. In T404, the CPU 201 causes Write-app 302 to receive the request ID. When Write-app 302 is activated, Write-app 302 receives an ID of Read-app 303 of a request source. The ID of Read-app 303 is unique to Read-app 303 installed in the communication device 101. When Read-app 303 is installed, the ID is stored in the HDD 204, and when a request for activating Write-app 302 is performed, the ID is read from the HDD 204 and transmitted.

In T405, the CPU 201 causes Write-app 302 to compare IDs of Read-apps 303. Specifically, Write-app 302 determines whether the ID of Read-app 303 of the request source matches one of IDs of Read-apps 303 stored in the HDD 204. Note that the CPU 201 operates in accordance with Write-app 302 and stores IDs of Read-apps 303 which may cooperate with Write-app 302 in advance such that the IDs of Read-apps 303 are readable by Write-app 302. In a case where the ID of Read-app 303 does not match the IDs stored in the HDD 204, the CPU 201 causes Write-app 302 to transmit an error notification to the OS and stops activation of Write-app 302. By this, activation of Write-app 302 which is mistakenly performed by an unknown application may be avoided.

On the other hand, when the ID of Read-app 303 matches one of the IDs stored in the HDD 204, the CPU 201 causes Write-app 302 to transmit a request for obtaining an image to the external apparatus (the imaging apparatus 102) in T407. In T408, the CPU 201 causes Write-app 302 to receive data on the image from the imaging apparatus 102 through the NET I/F 209.

When the reception of the image is completed, the CPU 201 causes Write-app 302 to perform a process of storing the image in T409. Specifically, the CPU 201 stores the image received in T408 in the HDD 204 or the like and assigns an image ID to the newly-stored image. The image ID serves as a code associated with a file path to a storage destination. Note that the image ID may be the file path to the storage destination itself.

In T410, the CPU 201 causes Write-app 302 to perform a process of generating an image ID list. Specifically, first, Write-app 302 obtains the image ID of the stored image, generates an image ID list including the image ID of the stored image and the storage destination which are associated with each other, and stores the image ID list which is readable by the OS in the HDD 204. In T411, the CPU 201 causes the OS to receive the request ID supplied from Write-app 302 as a request for calling Read-app 303 from Write-app 302. Here, the request ID is the same as that received by Write-app 302 in T404.

In T412, the CPU 201 causes the OS to transmit an activation request to Read-app 303 so as to activate Read-app 303. Here, when Read-app 303 is activated, Read-app 303 obtains an ID of Write-app 302 of a request source of the calling request. The ID of Write-app 302 is unique to Write-app 302 installed in the communication device 101, and is stored in the HDD 204 when Write-app 302 is installed and read and transmitted from the HDD 204 when the request for calling Read-app 303 is performed.

Furthermore, in the example in FIGS. 4A and 4B, Read-app 303 still operates even after the process in T402 is performed, and therefore, the process in T412 serves as a process of cancelling a sleep state or a process of confirming that Read-app 303 is operating. However, Read-app 303 may temporarily stops its operation after the process in T402 is performed. In T413, the CPU 201 causes Read-app 303 to receive the image ID list generated by Write-app 302 in T410 and the request ID received in T411 as a response through the OS.

In T414, the CPU 201 causes Read-app 303 to compare IDs of Write-apps 302. Specifically, Read-app 303 determines whether the ID of Write-app 302 matches IDs of Write-apps 302 stored in the HDD 204. Note that the CPU 201 operates in accordance with Read-app 303 and stores IDs of Write-apps 302 which may be cooperated with Read-app 303 in the HDD 204 in advance such that the IDs are readable by Read-app 303. When the ID of Write-app 302 does not match the IDs stored in the HDD 204, the CPU 201 causes Read-app 303 to transmit an error notification to the OS in T415 so as to stop the operation of Read-app 303. By this, activation of Read-app 303 mistakenly performed by an unknown application may be avoided.

On the other hand, when the ID of Write-app 302 matches one of the IDs stored in the HDD 204, the CPU 201 displays a screen corresponding to the request ID obtained in T413 in T416. For example, a screen displayed when Read-app 303 transmits the request ID in T401 is displayed in the display device 211. Thereafter, the CPU 201 obtains an image from the HDD 204 based on the image ID list obtained by Read-app 303 and adds the image to the list display. For example, when "Add Photograph by Write-app" is selected in the screen illustrated in FIG. 5B, the image is newly added to the list of images displayed on a left side in the screen illustrated in FIG. 5B after the screen illustrated in FIG. 5B is displayed.

Figure 5D:
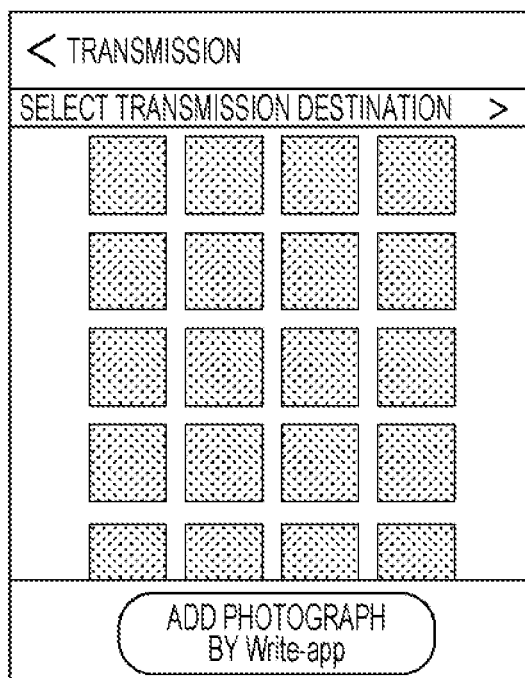
FIG. 5D is a diagram illustrating an example of a screen displayed when Read-app is activated.

A certain period of time is required from when the user selects "Add Photograph by Write-app" in one of the screens illustrated in FIGS. 5B to 5D to when an image is obtained from the imaging apparatus 102. For example, when the screen illustrated in FIG. 5B is displayed in a waiting state until an image is obtained, the obtained image is added to the screen in T416. However, a long period of time is required for obtaining an image from the imaging apparatus 102 in some cases, and in such a case, the user may stop operation of Read-app 303 and execute another process. Accordingly, in this embodiment, the request ID of Read-app 303 is obtained at the time when the activation of Write-app 302 is requested. By this, even if operation of Read-app 303 is temporarily stopped after the request for activating Write-app 302 is issued, content of a process performed by Read-app 303 when the request ID is transmitted may be identified when Read-app 303 is restarted after a process of Write-app 302 is completed. By this, a screen corresponding to the request for activating Write-app 302 is displayed when Read-app 303 is restarted after the process of Write-app 302 is completed, and therefore, the user may smoothly perform a desired editing process.

In T417, the CPU 201 causes Read-app 303 to perform the editing process selected by the user, store a result of the editing in the HDD 204 in accordance with the OS, and terminate the process. Note that the editing process may be started when the user instructs start of the editing process or immediately after the process in T416 is terminated. In the former case, in the example of the screen illustrated in FIG. 5C, after an image is obtained, the user selects a printer, the number of copies, and an image to be edited. After a print setting is input, an icon indicating start of printing is displayed, and when the icon is selected, the editing process (a print process) is started. In the latter case, in the example of the screen illustrated in FIG. 5C, first, the user selects a printer and the number of copies before selecting "Add Photograph by Write-app". When the user selects "Add Photograph by Write-app" after the print setting is input, it is determined that start of editing is instructed. Note that, when a plurality of images are obtained in T416, only an image to be subjected to the editing process may be selected by the user from among the plurality of images.

According to this embodiment, as described above, a request for activating Write-app 302 is issued by Read-app 303, a request ID corresponding to content of a process performed by Read-app 303 is transmitted, and Write-app 302 transmits a request ID to Read-app 303 as a response to a result of the process. By this, Read-app 303 may identify the result of the process corresponding to the request transmitted by Read-app 303 and operate in accordance with the request ID so that the user may smoothly perform a desired editing process. Furthermore, since the image ID list is transmitted to Read-app 303 as a response to the result of the process from Write-app 302, an image storage destination may be immediately referred to when Read-app 303 performs the editing process, and accordingly, the editing process may be more smoothly performed.

Second Embodiment

Hereinafter, a second embodiment of the present invention will be described with reference to the accompanying drawings. In this embodiment, a case where a user activates an application for data obtainment by operating a communication device (a smartphone) and activates an image editing application will be described as an example. Note that a configuration of the communication device according to this embodiment is the same as that of the first embodiment, and therefore, a description thereof is omitted.

Figure 6:
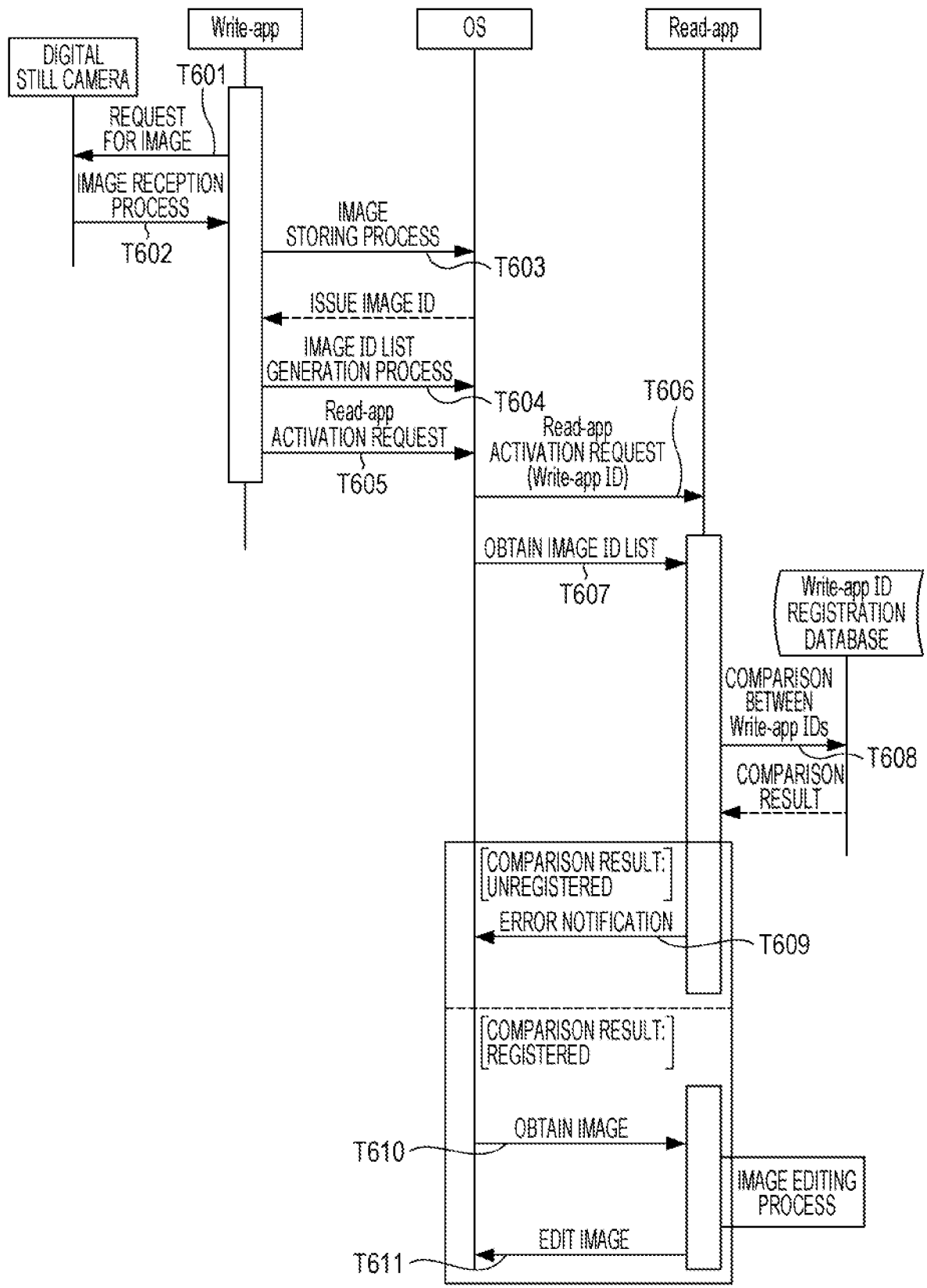
FIG. 6 is a sequence diagram illustrating a procedure of a process of activating Read-app by Write-app and performing an image editing process.

FIG. 6 is a sequence diagram illustrating a procedure of an image editing process performed when Read-app 303 is activated by Write-app 302 according to this embodiment.

First, the process is started when Write-app 302 is activated by a user operation. In T601, a CPU 201 causes Write-app 302 to transmit a request for obtaining an image to an external apparatus (an imaging apparatus 102). In T602, the CPU 201 causes Write-app 302 to receive data on the image from the imaging apparatus 102 through a NET I/F 209.

In T603, the CPU 201 causes Write-app 302 to perform a process of storing an image. Specifically, the CPU 201 stores the image received in T602 in an HDD 204 or the like and assigns an image ID to the newly-stored image. In T604, the CPU 201 causes Write-app 302 to perform a process of generating an image ID list. Specifically, first, Write-app 302 obtains the image ID of the stored image, generates an image ID list including the image ID of the stored image and a storage destination which are associated with each other, and stores the image ID list which is readable from an OS 301 in the HDD 204. In T605, the CPU 201 causes the OS 301 to receive a request for activating Read-app 303 from Write-app 302.

In T606, the CPU 201 causes the OS 301 to transmit an activation request to Read-app 303 so as to activate Read-app 303. Here, when Read-app 303 is activated, Read-app 303 obtains an ID of Write-app 302 which has issued the activation request. In T607, the CPU 201 causes Read-app 303 to receive the image ID list generated by Write-app 302 in T604 through the OS 301.

In T608, the CPU 201 causes Read-app 303 to compare IDs of Write-apps 302. Specifically, Read-app 303 determines whether the ID of Write-app 302 matches one of IDs of Write-apps 302 stored in the HDD 204. Note that the CPU 201 operates in accordance with Read-app 303 and stores an ID of Write-apps 302 which may be cooperated with Read-app 303 in the HDD 204 in advance such that the ID is readable by Read-app 303. When the ID of Write-app 302 does not match the IDs stored in the HDD 204, the CPU 201 causes Read-app 303 to transmit an error notification to the OS 301 in T609 and stops activation of Read-app 303. By this, activation of Read-app 303 mistakenly performed by an unknown application may be avoided.

On the other hand, when the ID of Write-app 302 matches one of the IDs stored in the HDD 204, the CPU 201 causes Read-app 303 to obtain the image stored in T603 from the HDD 204 based on the image ID list obtained in T607 in T610. Furthermore, the CPU 201 causes the display device 211 to display a screen which is to be used by the user to instruct content of editing. The screen illustrated in FIG. 5A, for example, is used as a screen by the user to instruct content of editing. When the user selects editing content, a screen illustrated in one of FIGS. 5B to 5D is displayed. Here, an image obtained from the imaging apparatus 102 is included in the image list. Note that the images may be displayed in the list such that the image obtained latest may be distinguished from the other images so that the latest obtained image is distinguished from the images which have been stored in the HDD 204.

In T611, the CPU 201 causes Read-app 303 to perform an editing process selected by the user and terminates the process.

As described above, according to this embodiment, even when Write-app 302 is activated by a user operation, Read-app 303 may be smoothly activated and an editing process may be selected.

Third Embodiment

Processing Procedure of Communication Device

A procedure of a process performed by a communication device 101 according to a third embodiment Will be described with reference to FIGS. 7 to 9E. In this embodiment, a case where a CPU 201 of a communication device 101 first activates Write-app 302, receives an instruction issued by a user during a process performed by Write-app 302, and activates Read-app 303 will be described as an example.

Figure 7A:
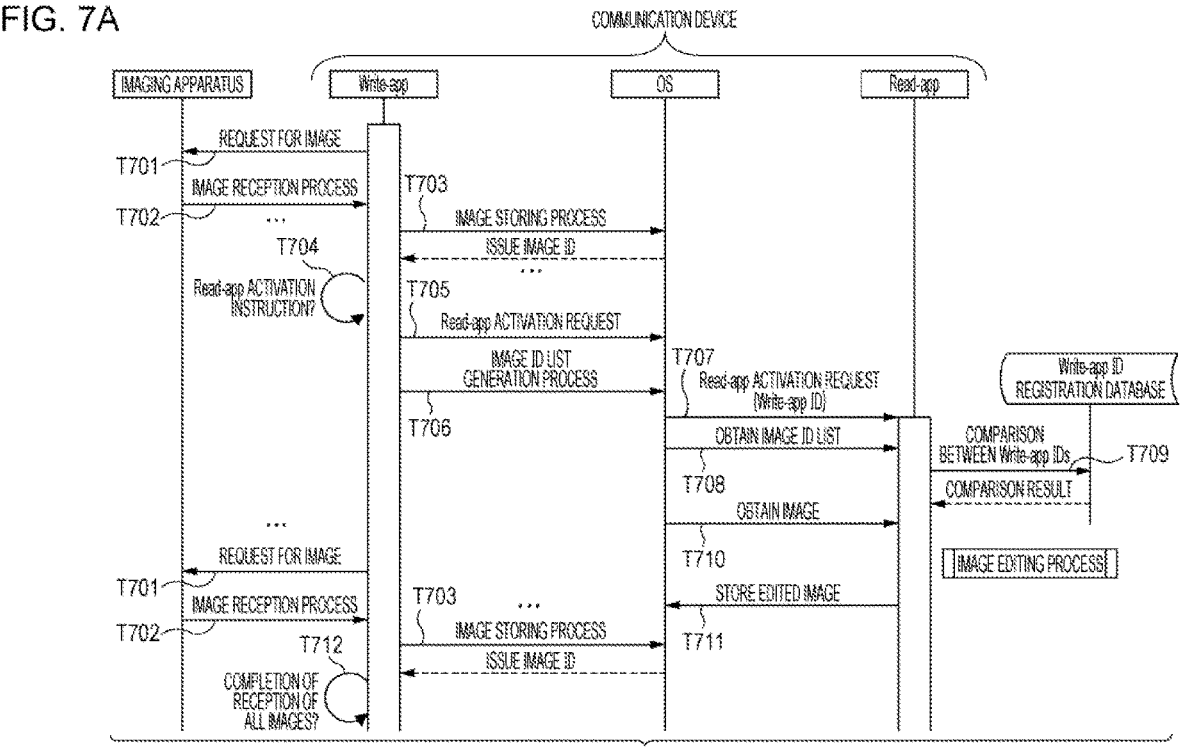
FIG. 7A is a sequence diagram illustrating a procedure of a process of activating Read-app by Write-app and performing an image editing process.

In sequence diagrams of FIGS. 7A and 7B, according to this embodiment, the CPU 201 of the communication device 101 activates Write-app 302 and causes Write-app 302 to obtain an image from an external apparatus. Thereafter, the CPU 201 of the communication device 101 activates Read-app 303 by a user operation during download of an image from the external apparatus and causes Read-app 303 to perform an image editing process on the obtained image. Note that the process described below is realized when the CPU 201 of the communication device 101 activates an OS 301, Write-app 302, and Read-app 303 and operates in accordance with the OS 301, Write-app 302, and Read-app 303 where appropriate, and controls various units.

FIGS. 7A and 7B are sequence diagrams illustrating a procedure of a process of activating Write-app 302 before activating Read-app 303 and performing an image editing process, which is performed by the CPU 201 of the communication device 101 according to this embodiment.

Figure 8A:
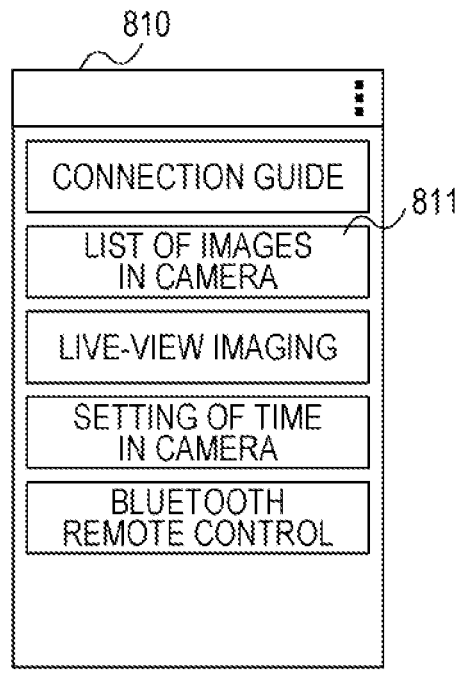
FIG. 8A is a diagram illustrating an example of a screen displayed when Write-app is activated.
Figure 8B:
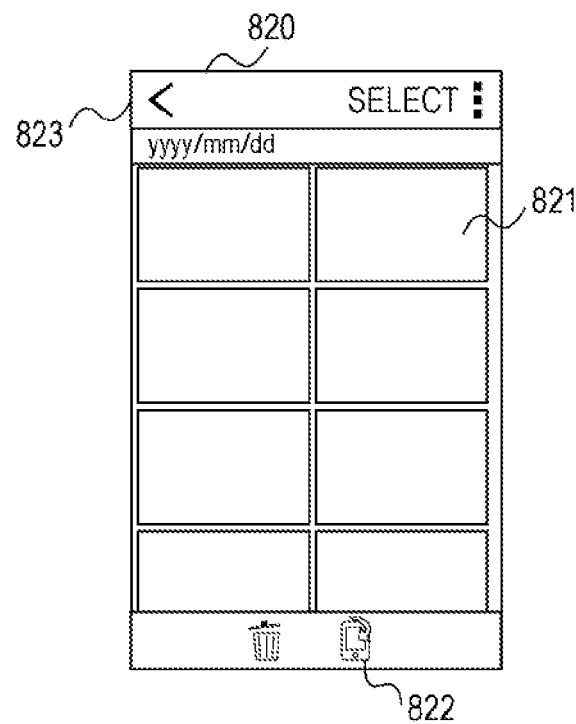
FIG. 8B is a diagram illustrating an example of a screen displayed when Write-app is activated.
Figure 8C:
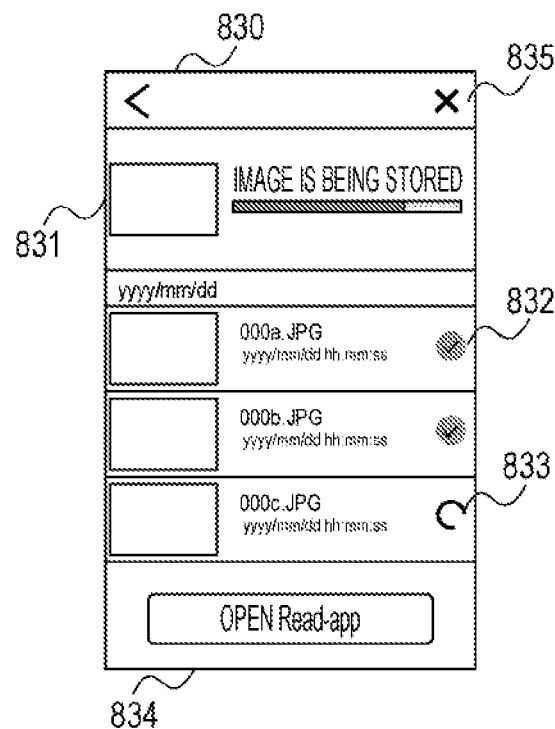
FIG. 8C is a diagram illustrating an example of a screen displayed when Write-app is activated.

First, the CPU 201 of the communication device 101 starts the process by activating Write-app 302 in response to a user operation. After activating Write-app 303, the CPU 201 causes a display device 211 to display a top screen 810 illustrated in FIG. 8A. When a press of a button "List of Images in Camera" 811 performed in accordance with a user operation is detected, the CPU 201 displays a screen 320 including a list of images in a camera illustrated in FIG. 8B in the display device 211. When a user operation of pressing a return icon 823 in FIG. 8B is detected, the CPU 201 stops execution of the function of displaying the list of the images in the camera and displays the top screen 810.

In the display of the screen 820 including the list of the images in the camera, the communication device 101 receives thumbnail images corresponding to captured images which have been recorded in a recording medium 410 of an imaging apparatus 102 from the imaging apparatus 102 and stores the thumbnail images in an HDD 204 of the communication device 101. Thereafter, the stored thumbnail images are read from the HDD 204 and displayed in the display device 211. The user selects a desired one of a plurality of thumbnail images 821 displayed as a list so as to use the selected thumbnail image by Read-app 303. When receiving a user operation of pressing an image obtaining icon 822, the CPU 201 stores information on the selected thumbnail image as a "list of images to be stored" in a RAM 203 such that the thumbnail image is readable by Write-app 302.

Note that, if a plurality of Read-apps 303 are installed in the communication device 101, the CPU 201 displays an application selection dialog for prompting the user to select one of Read-apps 303 which is requested to be activated by Write-app 302 in accordance with Write-app 302 in the display device 211. The CPU 201 stores a type of Read-app 303 selected by the user in the RAM 203 in advance such that the type is readable by Write-app 302.

Then in T701, the CPU 201 causes Write-app 302 to issue a request for obtaining main image data corresponding to the thumbnail image selected by the user to the external apparatus (the imaging apparatus 102) based on the list of images to be stored. In T702, the CPU 201 causes Write-app 302 to successively receive main image data from the imaging apparatus 102 through the NET I/F 209. Every time the main image data is supplied from the imaging apparatus 102, the CPU 201 performs a process of storing the main image data in accordance with Write-app 302 in T703. Specifically, the CPU 201 stores the main image data received in T702 in the HDD 204. Then the CPU 201 issues an image ID for the newly-stored main image data. Although the image ID serves as a code associated with a file path to a storage destination in this embodiment, the image ID may be other than the code.

The CPU 201 repeatedly executes the image receiving process in T702 and the image obtaining process including the image storing process and the image ID issuing process in T703 until obtainment of main image data included in the list of the images to be stored is completed. The CPU 201 displays a storage progress screen 830 illustrated in FIG. 8C in the display device 211 in accordance with Write-app 302 while the image obtaining process is repeatedly performed. The storage progress screen 830 includes an image information region 831 displaying a thumbnail image corresponding to the main image data being subjected to the image obtaining process and a progress bar indicating progress of the obtaining process. After the process of obtaining the main image data is completed, the image information region 831 displays a thumbnail image of main image data to be subjected to the obtaining process next. In an image information region 842, thumbnail images corresponding to the main image data which has been subjected to the image obtaining process and which has been stored in the HDD 204, file names, and marks indicating that the files have been obtained are displayed. In an image information region 833, as with the image information region 831, the thumbnail image corresponding to the main image data being subjected to the image obtaining process, a file name, and a mark indicating that the file is being obtained are displayed. In the image information region 833, when the process of obtaining the target main image data is completed, the mark indicating that the file is being obtained is updated to the mark indicating the file has been obtained. Thereafter, information on main image data of a target of the next obtaining process is additionally displayed in the storage progress screen 830. Furthermore, an icon 834 is used to receive a request for activating Read-app 303 from the user. The icon 834 is displayed in the storage progress screen 830 when at least one of the image data included in the list of the images to be stored is stored in the HDD 204. Furthermore, when pressing a button "Cancel" 835, the user may instruct interruption of the image obtaining process.

In T704, the CPU 201 determines whether a request for activating Read-app 303 has been issued. Specifically, the CPU 201 determines whether an operation of pressing the icon 834 in the storage progress screen 830 performed by the user has been detected. When the determination is affirmative, the CPU 201 notifies the OS 301 of the request for activating Read-app 303 issued by Write-app 302 in T705.

In T706, the CPU 201 causes Write-app 302 to perform a process of generating an image ID list. Specifically, first, Write-app 302 generates an image ID list indicating image IDs of image data which has been stored in T703 in a current time point and stores the image ID list in the HDD 204 such that the list is readable from the OS 301.

Figure 9A:
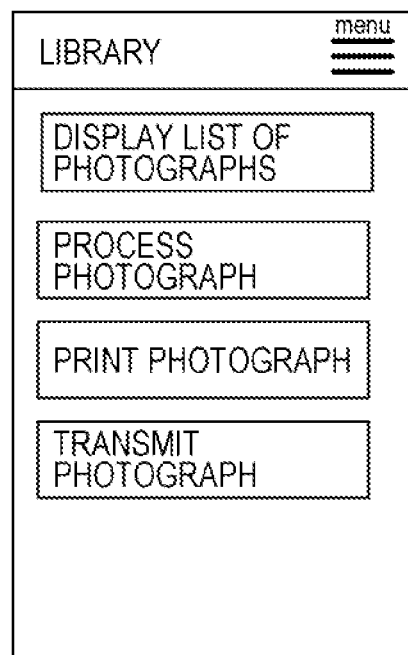
FIG. 9A is a diagram illustrating an example of a screen displayed when Read-app is activated.

In T707, the CPU 201 causes the OS 301 to issue a request for activating Read-app 303. At this time, the CPU 201 obtains an ID of Write-app 302 of a source of the activation request through the OS 301 and transmits the ID to Read-app 303. Furthermore, in T708, the CPU 201 causes Read-app 303 to receive the image ID list generated by Write-app 302 in T706 through the OS 301. In T709, the CPU 201 causes Read-app 303 to compare IDs of Write-apps 302. Specifically, it is determined whether the ID of Write-app 302 of the request source matches one of IDs of Write-apps 302 stored in the HDD 204. Note that the CPU 201 operates in accordance with Read-app 303 and an ID of Write-app 302 which may cooperate with Read-app 303 is stored in the HDD 204 in advance such that the ID is readable by Read-app 303. As a result of the comparison, when the ID of Write-app 302 of the request source obtained in T707 matches one of the IDs stored in advance in the HDD 204, the CPU 201 activates Read-app 303. By this, a screen of Write-app 302 is shifted to a background and therefore is not displayed, and a screen of Read-app 303 is displayed in a foreground. For example, in a case where Read-app 303 which has not been activated is newly activated, a screen illustrated in FIG. 9A is displayed. On the other hand, in a case where Read-app 303 has been activated and operates in the background, one of screens illustrated in FIGS. 9A to 9D which corresponds to a state of Read-app 303 is displayed.

Figure 9B:
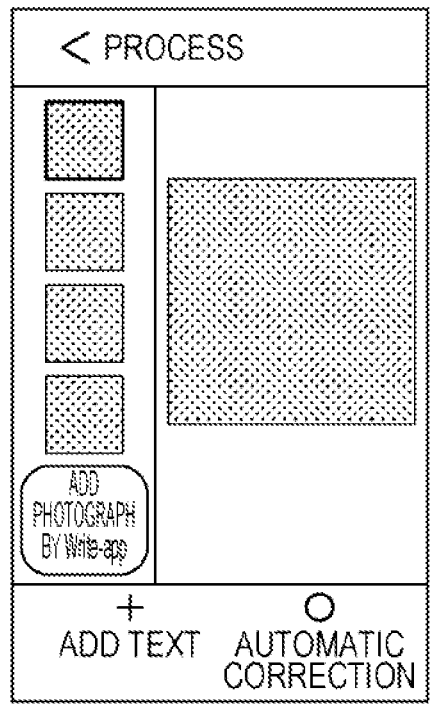
FIG. 9B is a diagram illustrating an example of a screen displayed when Read-app is activated.
Figure 9C:
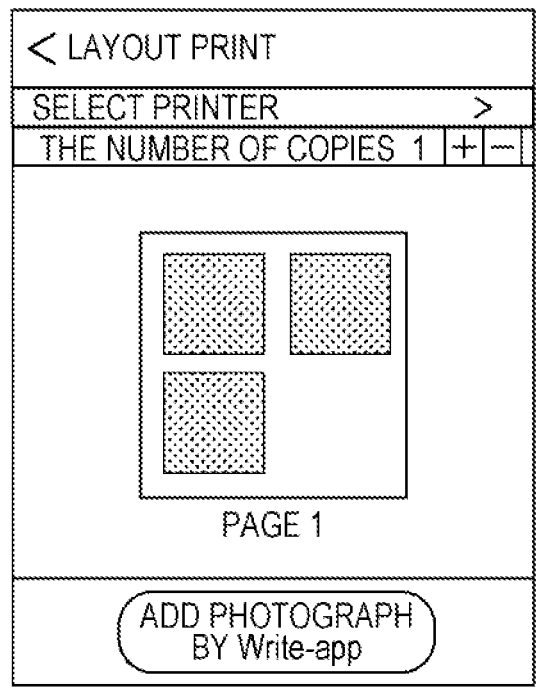
FIG. 9C is a diagram illustrating an example of a screen displayed when Read-app is activated.
Figure 9D:
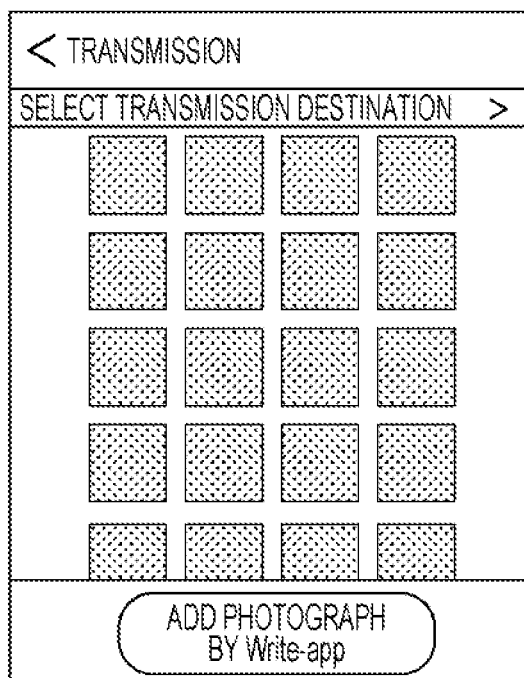
FIG. 9D is a diagram illustrating an example of a screen displayed when Read-app is activated.

In T710, the CPU 201 causes Read-app 303 to read and obtain the main image data stored in T703 based on the image ID list obtained in T708 from the HDD 204. Then the CPU 201 displays a screen which causes the user to specify editing content in the display device 211 in accordance with Read-app 303. The screen which causes the user to specify editing content is a screen illustrated in FIG. 9A, for example, and when the user selects editing content, one of the screens illustrated in FIGS. 9B to 9D is displayed. Here, in addition to the image obtained from the imaging apparatus 102 in T710, images which have been obtained by the communication device 101 by other methods are also included in the image list to be displayed. Therefore, the list may be displayed such that the image obtained from the imaging apparatus 102 in T710 is distinguished from the other images. The CPU 201 operates in accordance with Read-app 303, selects a desired one of the images displayed as the list in response to a user operation, and executes an editing process. In T711, the CPU 201 stores a result of the editing in the HDD 204 in accordance with Read-app 303.

Figure 9E:
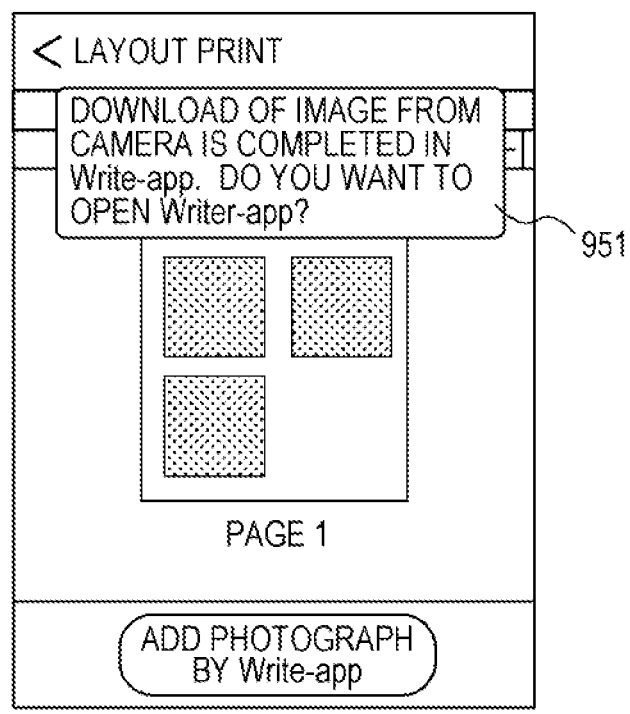
FIG. 9E is a diagram illustrating an example of a screen displayed when Read-app is activated.

Note that, although Write-app 302 is shifted to the background when Read-app 303 is activated, even after the shift, the CPU 201 operates in accordance with Write-app 302 and continues the process of obtaining the remaining images in the list of images to be stored while connection to the camera is maintained. Then in T712, the CPU 201 monitors whether the obtaining process has been performed on all the main image data included in the list of the image to be stored. When it is determined that the obtaining process has been performed on all the image data in the list of the images to be stored, the CPU 201 executes the process of generating an image ID list in T713 on an image ID of main image data which has not been included in the image ID list generated in T706. Specifically, first, the CPU 201 causes Write-app 302 to generate an image ID list indicating image IDs of image data stored in the HDD 204 after the image ID list is generated in T706, that is, after the process of activating Read-app 303 is performed. Then the image ID list is stored in the HDD 204 such that the image ID list is readable from the OS 301. Accordingly, Read-app 303 may receive the image ID list through the OS 301 in T723 described below and the image ID list may be used in a process of Read-app 303. Therefore, it may be said that the image ID list is stored in the HDD 204 by Write-app 302 so as to be usable in the process of Read-app 303. Furthermore, in T714, the CPU 201 transmits information on completion of the obtaining process to the OS 301 in accordance with Write-app 302. The CPU 201 performs notification control such that information on completion of storage of all the remaining images is transmitted to the user in T715 in accordance with the OS 301. Specifically, a message indicating that the process of obtaining the remaining images is completed is displayed in the display device 211. An example of the message displayed in T715 is illustrated in FIG. 9E. A message 951 is displayed in the foreground. Note that the OS 301 may notify Read-app 303 of completion of the obtaining process performed by Write-app 302 and display the message 951 in accordance with Read-app 303 instead of the OS 301. Alternatively, the message 951 may be displayed in accordance with Write-app 302 instead of the OS 301.

Note that, although the case where the CPU 201 transmits the notification when the obtaining process is completed in T714 is described in this embodiment, the number of images newly obtained may be transmitted to Read-app 303 through the OS 301 during the obtaining process.

In T716, the CPU 201 determines whether a request for calling Write-app 302 has been performed by Read-app 303. For example, it is determined whether the user has tapped a predetermined region in the message 951. When the determination is affirmative, the CPU 201 causes Read-app 303 to transmit a request for calling Write-app 302 to the OS 301 in T717. Furthermore, the CPU 201 disconnects connection to the external apparatus in accordance with Write-app 302.

Note that the CPU 201 causes Read-app 303 to issue a request ID in T716, and the CPU 201 associates the request ID with a request for calling Write-app 302 issued by Read-app 303 and stores the request ID and the request in the HDD 204. Here, the request ID varies in accordance with editing content being selected by Read-app 303. For example, the request ID varies in accordance with one of the screens illustrated in FIGS. 9B to 9D which is used to select "Add Photograph by Write-app".

In T718, the CPU 201 causes the OS 301 to issue an activation request to Write-app 302. Then the CPU 201 operates in accordance with Write-app 302 and receives a request ID. Furthermore, the CPU 201 operates in accordance with Write-app 302 and receives an ID of Read-app 303 of a request source through the OS 301. The ID of Read-app 303 which is unique to Read-app 303 installed in the communication device 101 is stored in the HDD 204 when Read-app 303 is installed and read and transmitted from the HDD 204 when a request for activating Write-app 302 is issued.

In T719, the CPU 201 causes Write-app 302 to compare IDs of Read-apps 303. Specifically, it is determined whether the ID of Read-app 303 of the request source matches one of IDs of Read-apps 303 stored in the HDD 204. Note that the CPU 201 operates in accordance with Write-app 302 and an ID of Read-app 303 which may cooperate with Write-app 302 is stored in the HDD 204 in advance such that the ID is readable from Write-app 302.

Figure 8D:
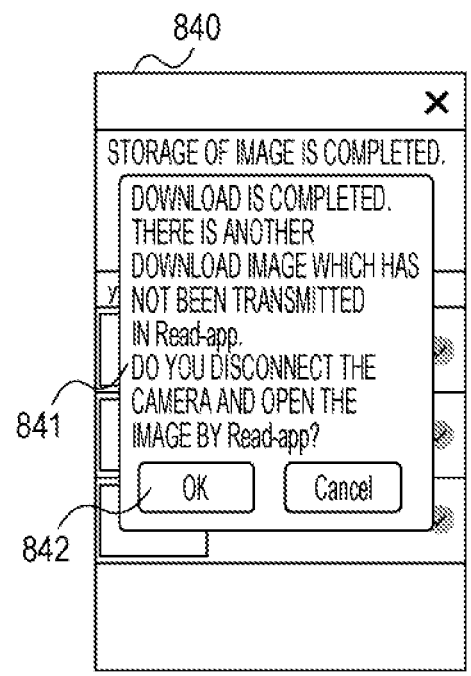
FIG. 8D is a diagram illustrating an example of a screen displayed when Write-app is activated.

As a result of the comparison, when the ID of Read-app 303 of the request source matches one of the IDs stored in advance in the HDD 204, the CPU 201 activates Write-app 302. By this, a screen of Read-app 303 is shifted to the background and therefore is not displayed, and a screen of Write-app 302 is displayed in the foreground. In this case, a storage completion screen 840 of Write-app 302 illustrated in FIG. 8D is displayed in the display device 211 along with a message dialog 341 indicating that the process of obtaining an image from the camera is completed.

In T720, the CPU 201 determines whether a request for activating Read-app 303 has been issued. Specifically, the CPU 201 determines whether an operation of activating Read-app 303 performed by the user in accordance with the message dialog 841 has been detected. When a press of an OK button 842 performed by the user is detected, the CPU 201 causes Write-app 302 to notify the OS 301 of a request for activating Read-app 303 in T721. Furthermore, the CPU 201 causes the OS 301 to receive a request ID from Write-app 302 as a request for calling Read-app 303 from Write-app 302. Here, the request ID is the same as that received by Write-app 302 from the OS 301 in T728.

Subsequently, in T722, the CPU 201 causes the OS 301 to issue a request for activating Read-app 303. Here, not only the ID of Write-app 302 of the request source but also the request ID is transmitted from the OS 301 to Read-app 303. The process to be performed onwards is the same as the process in T708 to T711 described above.

Note that Read-app 303 operates even after the process of calling Write-app 302 is performed in T717, and therefore, the process of activating Read-app 303 functions as cancel of a sleep state or a process of confirming that Read-app 303 is operating. Note that Read-app 303 may temporarily stop the operation after the process in T717 is performed and may be reactivated in response to an activation request issued in T721.

Note that the CPU 201 displays a screen corresponding to the request ID when Read-app 303 is activated and displays the screen of Read-app 303 in the foreground. The screen corresponding to the obtained request ID is displayed in T721. For example, the screen displayed when Read-app 303 transmits the request ID in T701 is displayed in the display device 211. Thereafter, the CPU 201 obtains an image from the HDD 204 based on the image ID list obtained by Read-app 303 and adds the image to the list display. For example, in the screen illustrated in FIG. 9B, an image is newly added to the display of the list of images on a left side in the screen.

According to this embodiment, the communication device 101 may activate Read-app 303 and execute the process of Read-app 303, such as "layout printing" on an obtained image even while an image is being obtained from the camera using Write-app 302. Furthermore, the process of obtaining a background image is continuously performed using Write-app 302 so that the process may be executed by Write-app 302 on the remaining images. Accordingly, a problem that the user is required to wait for a long period of time until the obtaining process is performed on all a large number of images is solved, and usability is improved.

Fourth Embodiment

Processing Procedure of Communication Device

A processing procedure of a communication device 101 according to a fourth embodiment will be described hereinafter with reference to FIGS. 9A to 10. In this embodiment, a case where a CPU 201 of the communication device 101 first activates Read-app 303, receives an instruction issued by a user in a screen for performing a process of Read-app 303, and executes a process of calling Write-app 302 will be described. Note that descriptions of components and processes the same as those of the first embodiment are omitted where appropriate.

First, the CPU 201 of the communication device 101 starts a process by activating Read-app 303 in response to a user operation. When Read-app 303 is activated, the CPU 201 displays a screen illustrated in FIG. 9A in a display device 211. In the screen illustrated in FIG. 9A, the user selects editing content to be executed through a touch panel of the display device 211.

For example, when "Process Photograph" is selected, a screen illustrated in FIG. 9B is displayed in the display device 211, and when "Print Photograph" is selected, a screen illustrated in FIG. 9C is displayed in the display device 211. When "Transmit Photograph" is selected, a screen illustrated in FIG. 9D is displayed in the display device 211. In the screens illustrated in FIGS. 9B to 9D, an image to be edited may be selected from among images stored in an HDD 204 or the like. On the other hand, when an image which is not stored in the communication device 101 is to be edited, "Add Photograph by Write-app" is selected so that, an image is obtained from an external apparatus. A process in FIG. 10 is started when the user selects "Add Photograph by Write-app".

In T1001 of FIG. 10, the CPU 201 causes Read-app 303 to issue a request ID. In T1002, the CPU 201 receives a request for activating Write-app 302 and stores the request ID issued in T1001 and the activation request which are associated with each other in the HDD 204. Here, the request ID varies depending on a selected editing content. For example, a request ID varies depending on one of the screens illustrated in FIGS. 9B to 9D in which "Add Photograph by Write-app" is selected.

In T1003, the CPU 201 causes an OS 301 to issue a request for activating Write-app 302 so as to activate Write-app 302. In T1004, the CPU 201 causes Write-app 302 to receive the request ID. When Write-app 302 is activated, Write-app 302 receives an ID of Read-app 303 of a request source. The ID of Read-app 303 which is unique to Read-app 303 installed in the communication device 101 is stored in the HDD 204 when Read-app 303 is installed and read and transmitted from the HDD 204 when a request for activating Write-app 302 is issued.

Subsequently, in T1005, the CPU 201 causes Write-app 302 to compare IDs of Read-apps 303 with each other. Specifically, Write-app 302 determines whether the ID of Read-app 303 of the request source matches one of IDs of Read-apps 303 stored in the HDD 204. Note that the CPU 201 operates in accordance with Write-app 302 and stores an ID of Read-app 303 which may cooperate with Write-app 302 in the HDD 204 in advance such that the ID is readable by Write-app 302. When the ID of Read-app 303 matches one of the IDs stored in the HDD 204, the CPU 201 activates Write-app 302. By this, a screen of Read-app 303 is shifted to a background and therefore is not displayed, and a screen of Write-app 302 is displayed in a foreground. For example, in a case where Write-app 302 which has not been activated is newly activated, a top screen 810 illustrated in FIG. 8A is displayed. Furthermore, in a case where a function of "a list of images in a camera" is executed in the background during Write-app 302 is operated, for example, an image list screen 820 illustrated in FIG. 8B is displayed.

Then the CPU 201 detects a state of Write-app 302 and executes a process corresponding to the detected state. Subsequently, the CPU 201 executes the function of a list of images in a camera and determines main image data to be obtained in response to a user operation. Thereafter, the process in T701 onwards in FIGS. 7A and 7B of the first embodiment is performed.

Other Embodiments

In the foregoing embodiments, the case where Write-app 302 is an application which obtains an image from the imaging apparatus 102 is illustrated as an example. However, Write-app 302 may be other applications. For example, Write-app 302 may be an application for searching a database for an image or an application which performs an imaging process. In this case, an image ID list including an ID of a searched image or an ID of an image which is newly captured is generated. Furthermore, although image data is used according to the foregoing embodiments, not only image data but also other data including audio data may be used.

Furthermore, although a smartphone is employed as an example of an information processing apparatus in the foregoing embodiments, any device may be employed as long as an application may be installed in the device. For example, a cellular phone, a tablet device, a personal computer (PC), or the like may be similarly employed as the information processing apparatus. In a case where Read-app 303 or Write-app 302 is an application which does not require a communication function, the information processing apparatus may not be a communication device.

Figure 11A:
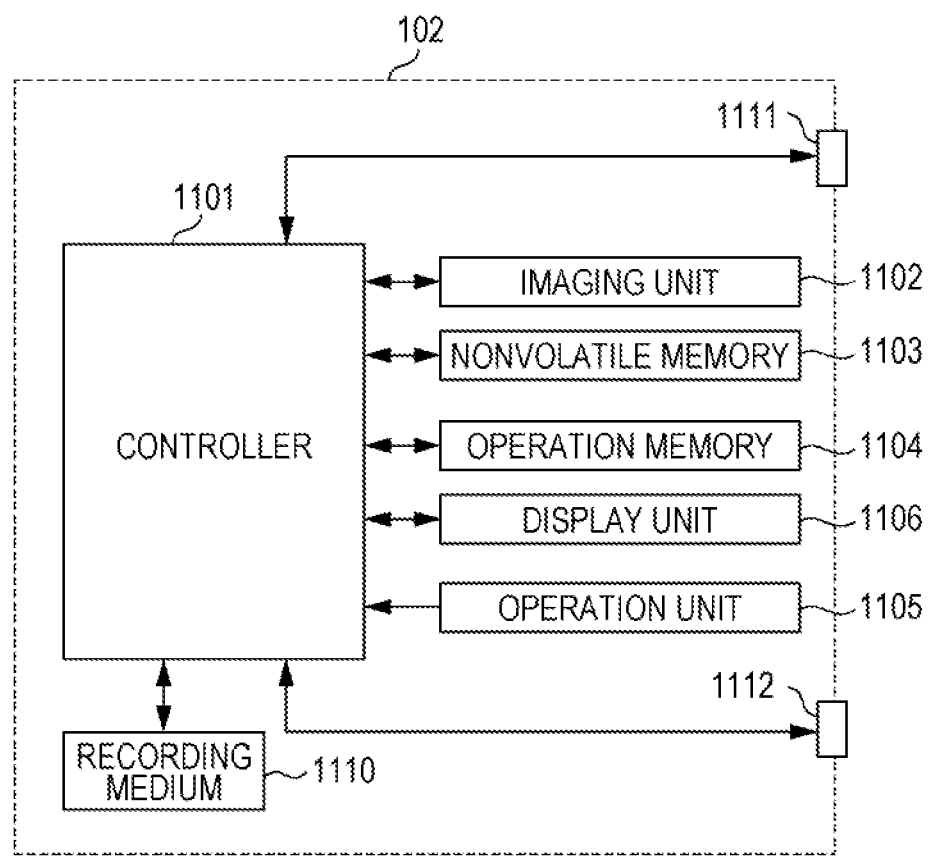
FIG. 11A is a diagram illustrating an example of a configuration of an external apparatus.

An imaging apparatus which is an example of the external apparatus according to the present invention will now be described. FIG. 11A is a block diagram illustrating an example of a configuration of the imaging apparatus 102 which is an example of the external apparatus according to this embodiment. Although an imaging apparatus is described as an example of the external apparatus, the external apparatus is not limited to this. Examples of the external apparatus include a mobile media player and information processing apparatuses, such as a tablet device and a personal computer.

A controller 1101 controls various units included in the imaging apparatus 102 in accordance with an input signal and programs described below. Note that a plurality of hardware sections may share processes so as to control the entire apparatus instead of control of the entire apparatus performed by the controller 1101.

An imaging unit 1102 includes an optical lens unit, an optical system which controls diaphragm, zoom, and focus, and an imaging element which converts light (a video image) introduced through the optical lens unit into an electric video signal. Examples of the imaging element generally include a complementary metal oxide semiconductor (CMOS) sensor and a charge coupled device (CCD) sensor. The imaging unit 1102 converts subject light formed on a lens included in the imaging unit 1102 into an electric signal using the imaging element, performs a noise reduction process, and outputs resultant digital data as image data under control of the controller 1101. In the imaging apparatus 102 of this embodiment, image data is stored in a recording medium 1110 in accordance with a standard of the design rule for camera file system (DCF).

A nonvolatile memory 1103 is an electrically erasable/recordable nonvolatile memory and stores programs described below to be executed by the controller 1101 and the like.

An operation memory 1104 is used as a buffer memory which temporarily stores image data captured by the imaging unit 1102, an image display memory for a display unit 1106, a work area for the controller 1101, and the like.

An operation unit 1105 is used to receive an instruction issued by the user to the imaging apparatus 102 from the user. The operation unit 1105 includes a power source button used by the user to instruct an ON state or an OFF state of a power source of the imaging apparatus 102, a release switch for instructing imaging, and a reproduction button for instructing reproduction of image data, for example. The operation unit 1105 further includes operation members, such as a connection button dedicated for start of communication with the external apparatus through a communication unit 1111 described below. Furthermore, a touch panel formed on the display unit 1106 described below is also included in the operation unit 1105. Note that the release switch includes switches SW1 and SW2. When the release switch is brought into a half-press state, the switch SW1 is turned on. By this, an instruction for performing preparation for imaging including an auto-focus (AF) process, an auto exposure (AE) process, an auto white balance (AWB) process, and a flash preliminary light emission (EF) process is received. Furthermore, when the release switch is brought into a full-press state, the switch SW2 is turned on. By this, an instruction for performing imaging is received.

The display unit 1106 performs display of a view-finder image at a time of imaging, display of data on a captured image, and display of text for a dialogical operation. Note that the display unit 1106 may not be incorporated in the imaging apparatus 102. The imaging apparatus 102 at least capable of being connected to the display unit 1106 which is internally or externally provided and at least has a display control function of controlling display of the display unit 1106.

The recording medium 1110 may record image data output from the imaging unit 1102. The recording medium 1110 may be attachable to the imaging apparatus 102 or incorporated in the imaging apparatus 102. Specifically, the imaging apparatus 102 at least include a unit for accessing the recording medium 1110.

The communication unit 1111 is an interface for connection to the external apparatus. The imaging apparatus 102 of this embodiment may perform transmission and reception of data with the external apparatus through the communication unit 1111. For example, the imaging apparatus 102 may transmit image data generated by the imaging unit 1102 to the external apparatus through the communication unit 1111. Furthermore, imaging performed by the imaging unit 1102 may be controlled by the external apparatus through the communication unit 1111. Note that, in this embodiment, the communication unit 1111 includes an interface for so-called wireless LAN communication between the communication unit 1111 and the external apparatus in accordance with the standard of IEEE802.11. The controller 1101 realizes the wireless communication with the external apparatus by controlling the communication unit 1111.

A proximity wireless communication unit 1112 includes an antenna for wireless communication, a modulation/demodulation circuit which processes a wireless signal, and a communication controller, for example. The proximity wireless communication unit 1112 outputs a modulated wireless signal through the antenna and demodulate a wireless signal received by the antenna so as to realize proximity wireless communication based on the standard of IEEE802.15 (so-called Bluetooth (registered trademark)). In this embodiment, as the Bluetooth communication, Bluetooth Low Energy version 4.0 (BLE) which consumes low electric power is employed. The BLE communication has a narrower communication available range when compared with the wireless LAN communication (that is, a communication available distance is short). Furthermore, the BLE communication has a communication speed slower than that of the wireless LAN communication. On the other hand, the BLE communication consumes electric power less than the wireless LAN communication. The imaging apparatus 102 of this embodiment is capable of performing transmission and reception of data with the external apparatus through the proximity wireless communication unit 1112. For example, imaging performed by the imaging unit 1102 may be controlled by the external apparatus through the proximity wireless communication unit 1112. However, since the communication speed is low, the image data generated by the imaging unit 1102 is not transmitted.

Note that the communication unit 1111 of the imaging apparatus 102 of this embodiment has an AP mode in which the communication unit 1111 operates as an access point in an infrastructure mode and a CL mode in which the communication unit 1111 operates as a client in the infrastructure mode. When the communication unit 1111 operates in the CL mode, the imaging apparatus 102 of this embodiment may operate as a CL device in the infrastructure mode. In a case where the imaging apparatus 102 operates as a CL device, when the imaging apparatus 102 is connected to a peripheral AP device, the imaging apparatus 102 may be added to a network formed by the AP device. Furthermore, when the communication unit 1111 operates in the AP mode, the imaging apparatus 102 of this embodiment may operate as an AP having limited functions (a simple AP) which is a type of AP. When the imaging apparatus 102 operates as a simple AP, the imaging apparatus 102 forms a network by itself. Apparatuses near the imaging apparatus 102 recognize the imaging apparatus 102 as an AP device and may be added to the network formed by the imaging apparatus 102. As described above, the program for operating the imaging apparatus 102 is stored in the nonvolatile memory 1103.

Note that, although the imaging apparatus 102 of this embodiment is a type of AP, the imaging apparatus 102 is a simple AP which does not have a gateway function of transferring data received from the CL device to an internet provider or the like. Accordingly, even if the imaging apparatus 102 receives data from another apparatus included in the network formed by the imaging apparatus 102, the imaging apparatus 102 does not transfer the data to a network, such as the Internet.

Figure 11B:
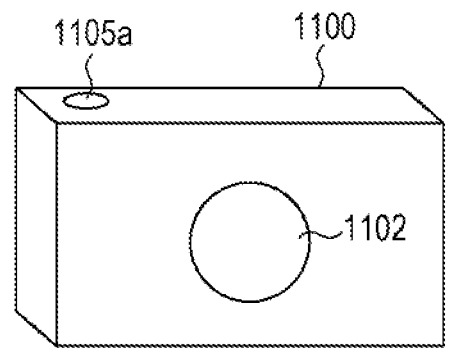
FIG. 11B is a diagram illustrating an example of a configuration of the external apparatus.
Figure 11C:
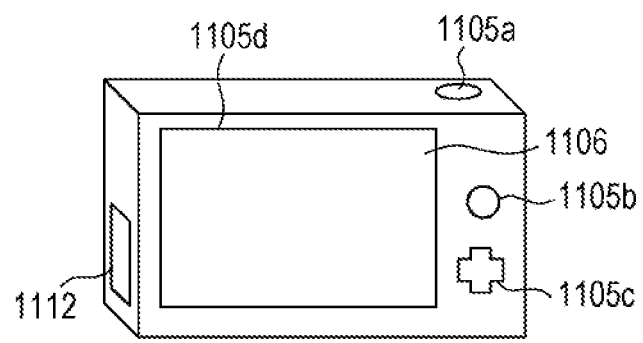
FIG. 11C is a diagram illustrating an example of a configuration of the external apparatus.

Next, appearance of the imaging apparatus 102 will be described. FIGS. 11B and 11C are diagrams illustrating an example of appearance of the imaging apparatus 102. A release switch 1105a, a reproduction button 1105b, a direction key 1105c, and a touch panel 1105d are operation members included in the operation unit 1105 described above. Furthermore, an image obtained as a result of imaging performed by the imaging unit 1102 is displayed in the display unit 1106. Furthermore, the imaging apparatus 102 of this embodiment has an antenna portion of the proximity wireless communication unit 1112 on a side surface of a camera case. By bringing the proximity wireless communication unit 1112 close to a proximity wireless communication unit 1112 of another device in a certain distance, proximity wireless communication with the other device may be established. By this, non-contact communication without a cable or the like may be realized and a communication partner may be limited as desired by the user.

According to the present invention, in a case where, during a first application is operated, a second application is activated so as to be operated, the first application may smoothly perform a process after the second application is executed.

The present invention is also realized when a program which realizes at least one of the functions of the foregoing embodiments is supplied to a system or an apparatus through a network or a storage medium and at least one processor of a computer included in the system or the apparatus reads and executes the program. Furthermore, the present invention may be realized by a circuit (such as an application specific integrated circuit (ASIC)) which realizes at least one of the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more processors; and
one or more memories storing programs including a first application program for executing a process of outputting content and a second application program for executing a process of obtaining the content from an external apparatus, which, when executed by the processor, causes the information processing apparatus to:
issue a request for activating the second application program in accordance with the first application program;
activate the second application program in response to the request for activating the second application program;
communicate with the external apparatus and execute a process of obtaining the content from the external apparatus in accordance with the activated second application program;
issue a request for activating the first application program in accordance with the second application program after the content is obtained from the external apparatus;
activate the first application program in response to the request for activating the first application program; and
execute an output process on the content obtained from the external apparatus in accordance with the first application program,
wherein an identifier of the first application program is issued when the request for activating the second application program is issued, and
wherein the first application program is activated based on the identifier.

2. The information processing apparatus according to claim 1, wherein the program when executed by the processor further causes the information processing apparatus to display a screen of the second application program and a screen of the first application program, respectively, in a foreground.

3. The information processing apparatus according to claim 1, wherein the identifier specifies a state of the first application program.

4. An information processing apparatus comprising:
one or more processors; and
one or more memories storing programs including a first application program for executing a process of outputting content and a second application program for executing a process of obtaining the content from an external apparatus, which, when executed by the processor, causes the information processing apparatus to:
issue a request for activating the second application program in accordance with the first application program;
activate the second application program in response to the request for activating the second application program;
communicate with the external apparatus and execute a process of obtaining the content from the external apparatus in accordance with the activated second application program;
issue a request for activating the first application program in accordance with the second application program after the content is obtained from the external apparatus;
activate the first application program in response to the request for activating the first application program;
execute an output process on the content obtained from the external apparatus in accordance with the first application program; and
select whether a request for activating the first application program is to be issued in accordance with the second application program in response to a user operation after the content is obtained from the external apparatus,
wherein a request for activating the first application program is issued in accordance with a result of the selection.

5. An information processing apparatus comprising:
one or more processors; and
one or more memories storing programs including a first application program for executing a process of outputting content and a second application program for executing a process of obtaining the content from an external apparatus, which, when executed by the processor, causes the information processing apparatus to:
issue a request for activating the second application program in accordance with the first application program;
activate the second application program in response to the request for activating the second application program;

communicate with the external apparatus and execute a process of obtaining the content from the external apparatus in accordance with the activated second application program;

issue a request for activating the first application program in accordance with the second application program after the content is obtained from the external apparatus;

activate the first application program in response to the request for activating the first application program;

execute an output process on the content obtained from the external apparatus in accordance with the first application program;

generate information on the obtained content in accordance with the second application program;

store the generated information in a storage medium such that the information is usable by the first application program; and perform control such that notification is performed after a process of obtaining remaining content from the external apparatus is terminated which is performed while the first application program is operated, wherein the request for activating the first application program is capable of being issued when a process of obtaining at least one content is executed, and wherein the content is obtained from the external apparatus based on the stored information and an output process is executed.

6. An information processing apparatus comprising:
one or more processors; and
one or more memories storing programs including a first application program for executing a process of outputting content and a second application program for executing a process of obtaining the content from an external apparatus, which, when executed by the processor, causes the information processing apparatus to:

issue a request for activating the second application program in accordance with the first application program;

activate the second application program in response to the request for activating the second application program;

communicate with the external apparatus and execute a process of obtaining the content from the external apparatus in accordance with the activated second application program;

issue a request for activating the first application program in accordance with the second application program after the content is obtained from the external apparatus;

activate the first application program in response to the request for activating the first application program;

execute an output process on the content obtained from the external apparatus in accordance with the first application program;

generate information on the obtained content in accordance with the second application program;

store the generated information in a storage medium such that the information is usable by the first application program; and perform control such that communication with the external apparatus is disconnected after a process of obtaining remaining content from the external apparatus is terminated which is performed while the first application program is operated, wherein the request for activating the first application program is capable of being issued when a process of obtaining at least one content is executed, and wherein the content is obtained from the external apparatus based on the stored information and an output process is executed.

7. A method for controlling an information processing apparatus including a first application program for executing a process of outputting content and a second application program for executing a process of obtaining the content from an external apparatus, the method comprising:

issuing a request for activating the second application program in accordance with the first application program, wherein an identifier of the first application program is issued when the request for activating the second application program is issued;

activating the second application program in response to the request for activating the second application program;

communicating with the external apparatus and executing a process of obtaining the content from the external apparatus in accordance with the activated second application program;

issuing a request for activating the first application program in accordance with the second application program after the content is obtained from the external apparatus;

activating the first application program in response to the request for activating the first application program, wherein the first application program is activated based on the identifier; and executing an output process on the content obtained from the external apparatus in accordance with the first application program.

8. A method for controlling an information processing apparatus including a first application program for executing a process of outputting content and a second application program for executing a process of obtaining the content from an external apparatus, the method comprising:

issuing a request for activating the second application program in accordance with the first application program;

activating the second application program in response to the request for activating the second application program;

communicating with the external apparatus and executing a process of obtaining the content from the external apparatus in accordance with the activated second application program;

issuing a request for activating the first application program in accordance with the second application program after the content is obtained from the external apparatus;

activating the first application program in response to the request for activating the first application program;

executing an output process on the content obtained from the external apparatus in accordance with the first application program; and selecting whether a request for activating the first application program is to be issued in accordance with the second application program in response to a user operation after the content is obtained from the external apparatus, wherein a request for activating the first application program is issued in accordance with a result of the selection.

9. A method for controlling an information processing apparatus including a first application program for executing a process of outputting content and a second application program for executing a process of obtaining the content from an external apparatus, the method comprising:
issuing a request for activating the second application program in accordance with the first application program;
activating the second application program in response to the request for activating the second application program;
communicating with the external apparatus and executing a process of obtaining the content from the external apparatus in accordance with the activated second application program;
issuing a request for activating the first application program in accordance with the second application program after the content is obtained from the external apparatus;
activating the first application program in response to the request for activating the first application program;
executing an output process on the content obtained from the external apparatus in accordance with the first application program;
generating information on the obtained content in accordance with the second application program;
storing the generated information in a storage medium such that the information is usable by the first application program; and
performing control such that notification is performed after a process of obtaining remaining content from the external apparatus is terminated, which is performed while the first application program is operated,
wherein the request for activating the first application program is capable of being issued when a process of obtaining at least one content is executed, and
wherein the content is obtained from the external apparatus based on the stored information and an output process is executed.

10. A method for controlling an information processing apparatus including a first application program for executing a process of outputting content and a second application program for executing a process of obtaining the content from an external apparatus, the method comprising:
issuing a request for activating the second application program in accordance with the first application program;
activating the second application program in response to the request for activating the second application program;
communicating with the external apparatus and executing a process of obtaining the content from the external apparatus in accordance with the activated second application program;
issuing a request for activating the first application program in accordance with the second application program after the content is obtained from the external apparatus;
activating the first application program in response to the request for activating the first application program;
executing an output process on the content obtained from the external apparatus in accordance with the first application program;
generating information on the obtained content in accordance with the second application program;
storing the generated information in a storage medium such that the information is usable by the first application program; and
performing control such that communication with the external apparatus is disconnected after a process of obtaining remaining content from the external apparatus is terminated, which is performed while the first application program is operated,
wherein the request for activating the first application program is capable of being issued when a process of obtaining at least one content is executed, and
wherein the content is obtained from the external apparatus based on the stored information and an output process is executed.

11. A non-transitory storage medium storing a computer readable program that causes a computer to execute:
issuing a request for activating a second application program for executing a process of obtaining content from an external apparatus in accordance with a first application program for executing a process of outputting the content, wherein an identifier of the first application program is issued when the request for activating the second application program is issued;
activating the second application program in response to the request for activating the second application program;
communicating with the external apparatus and executing a process of obtaining the content from the external apparatus in accordance with the activated second application program;
issuing a request for activating the first application program in accordance with the second application program after the content is obtained from the external apparatus;
activating the first application program in response to the request for activating the first application program, wherein the first application program is activated based on the identifier; and
executing an output process on the content obtained from the external apparatus in accordance with the first application program.

12. A non-transitory storage medium storing a computer readable program, that causes a computer to execute:
issuing a request for activating a second application program for executing a process of obtaining content from an external apparatus in accordance with a first application program for executing a process of outputting the content;
activating the second application program in response to the request for activating the second application program;
communicating with the external apparatus and executing a process of obtaining the content from the external apparatus in accordance with the activated second application program;
issuing a request for activating the first application program in accordance with the second application program after the content is obtained from the external apparatus;
activating the first application program in response to the request for activating the first application program;
executing an output process on the content obtained from the external apparatus in accordance with the first application program; and
selecting whether a request for activating the first application program is to be issued in accordance with the second application program in response to a user operation after the content is obtained from the external apparatus,
wherein the request for activating the first application program is issued in accordance with a result of the selection.

13. A non-transitory storage medium storing a computer readable program that causes a computer to execute:
  issuing a request for activating a second application program for executing a process of obtaining content from an external apparatus in accordance with a first application program for executing a process of outputting the content;
  activating the second application program in response to the request for activating the second application program;
  communicating with the external apparatus and executing a process of obtaining the content from the external apparatus in accordance with the activated second application program;
  issuing a request for activating the first application program in accordance with the second application program after the content is obtained from the external apparatus;
  activating the first application program in response to the request for activating the first application program;
  executing an output process on the content obtained from the external apparatus in accordance with the first application program;
  generating information on the obtained content;
  storing the generated information a storage medium such that the information is usable by the first application program; and
  performing control such that notification is performed after a process of obtaining remaining content from the external apparatus is terminated which is performed while the first application program is operated,
  wherein the request for activating the other program is capable of being issued when a process of obtaining at least one content is executed, and
  wherein the content is obtained from the external apparatus based on the stored information and an output process is executed.

14. A non-transitory storage medium storing a computer readable program that causes a computer to execute:
  issuing a request for activating a second application program for executing a process of obtaining content from an external apparatus in accordance with a first application program for executing a process of outputting the content;
  activating the second application program in response to the request for activating the second application program;
  communicating with the external apparatus and executing a process of obtaining the content from the external apparatus in accordance with the activated second application program;
  issuing a request for activating the first application program in accordance with the second application program after the content is obtained from the external apparatus;
  activating the first application program in response to the request for activating the first application program;
  executing an output process on the content obtained from the external apparatus in accordance with the first application program;
  generating information on the obtained content in accordance with the second application program;
  storing the generated information in a storage medium such that the information is usable by the first application program; and
  performing control such that communication with the external apparatus is disconnected after a process of obtaining remaining content from the external apparatus is terminated which is performed while the first application program is operated,
  wherein the request for activating the first application program is capable of being issued when a process of obtaining at least one content is executed, and
  wherein the content is obtained from the external apparatus based on the stored information and an output process is executed.

* * * * *